United States Patent
Que et al.

(10) Patent No.: US 9,247,618 B1
(45) Date of Patent: Jan. 26, 2016

(54) BACK LIGHT BRIGHTNESS ADJUSTING APPARATUS

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Zheng-Sheng Que, Wuhan (CN); Chun-Sheng Chen, New Taipei (TW)

(73) Assignees: HONG FU JIN PRECISION INDUSTRY (WuHan) CO., LTD., Wuhan (CN); HON HAI PRECISION INDUSTRTY CO., LTD., New Taipei (TW)

( * ) Notice: Subject to any disclaimer, the term of this patent is extended or adjusted under 35 U.S.C. 154(b) by 0 days.

(21) Appl. No.: 14/682,913

(22) Filed: Apr. 9, 2015

(30) Foreign Application Priority Data

Jan. 9, 2015 (CN) .......................... 2015 1 0010902

(51) Int. Cl.
*H05B 37/00* (2006.01)
*H05B 37/02* (2006.01)

(52) U.S. Cl.
CPC ..................................... *H05B 37/02* (2013.01)

(58) Field of Classification Search
CPC ........................................................ H05B 37/02
USPC .............................................. 315/291; 345/89
See application file for complete search history.

(56) References Cited

U.S. PATENT DOCUMENTS

| 2008/0117152 A1* | 5/2008 | Hsu ...................... G09G 3/3406 345/89 |
| 2012/0013633 A1* | 1/2012 | Chen .................. G06F 3/03542 345/589 |

* cited by examiner

*Primary Examiner* — Don Le
(74) *Attorney, Agent, or Firm* — Novak Druce Connolly Bove + Quigg LLP

(57) ABSTRACT

A back light brightness adjusting apparatus includes a control unit, a first adjusting unit, and a second adjusting unit. The control unit receives a first control signal from a display chip, and outputs at least one of a first switch signal or a second switch signal. The second adjusting unit receives a second control signal from the display chip. When the electronic device is turned on, the control unit outputs the first switch signal at a first voltage and the second switch signal at a second voltage, a first adjusting signal is received from a CPU and the back light brightness is adjusted. When the electronic device is turned off, the control unit outputs the first switch signal at a third voltage and the second switch signal at a fourth voltage, a second adjusting signal is received from the display chip and back light brightness is adjusted accordingly.

16 Claims, 2 Drawing Sheets

BACK LIGHT BRIGHTNESS ADJUSTING APPARATUS

CROSS-REFERENCE TO RELATED APPLICATIONS

This application claims priority to Chinese Patent Application No. 201510010902.8 filed on Jan. 9, 2015, the contents of which are incorporated by reference herein in its entirety.

FIELD

The subject matter herein generally relates to device illumination.

BACKGROUND

Back light brightness of all in one (AIO) computers are adjusted by the central processing unit (CPU) in a host computer or by the display chip in a monitor. In the Windows 8 operating system, the back light brightness must be adjustable by the CPU so as to pass a windows hardware quality laboratory (WHQL) test of Microsoft company. When the AIO computer is only used as a monitor and communicates with peripheral devices, the back light brightness is adjusted by the display chip and cannot pass the WHQL test.

BRIEF DESCRIPTION OF THE DRAWINGS

Implementations of the present technology will now be described, by way of example only, with reference to the attached figures.

DETAILED DESCRIPTION

Figure 1:
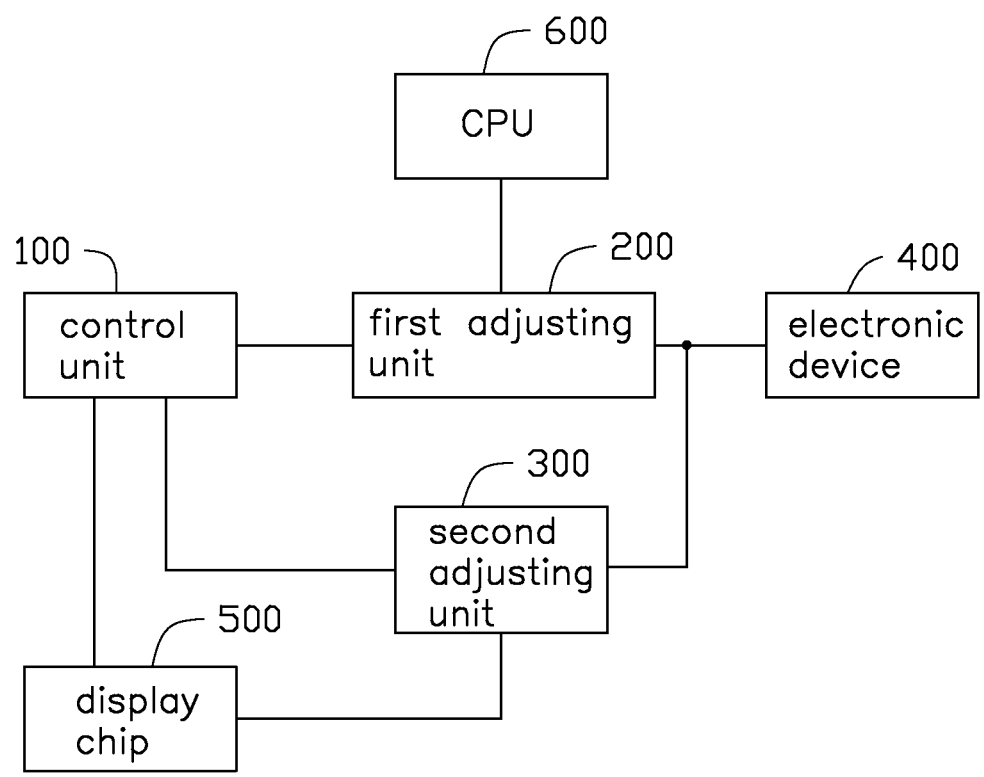
FIG. 1 is a block diagram of an embodiment of a back light brightness adjusting apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like. "Unit" means a collection of electronic hardware alone or in combination with software configured for a particular task or function, although units may overlap or share components.

FIG. 1 illustrates a back light brightness adjusting apparatus in accordance with one embodiment. The back light brightness adjusting apparatus includes a control unit 100, a first adjusting unit 200, and a second adjusting unit 300. The first adjusting unit 200 and the second adjusting unit 300 are configured to adjust a back light brightness of an electronic device 400. In at least one embodiment, the electronic device 400 is an all in one (AIO) computer.

Figure 2:
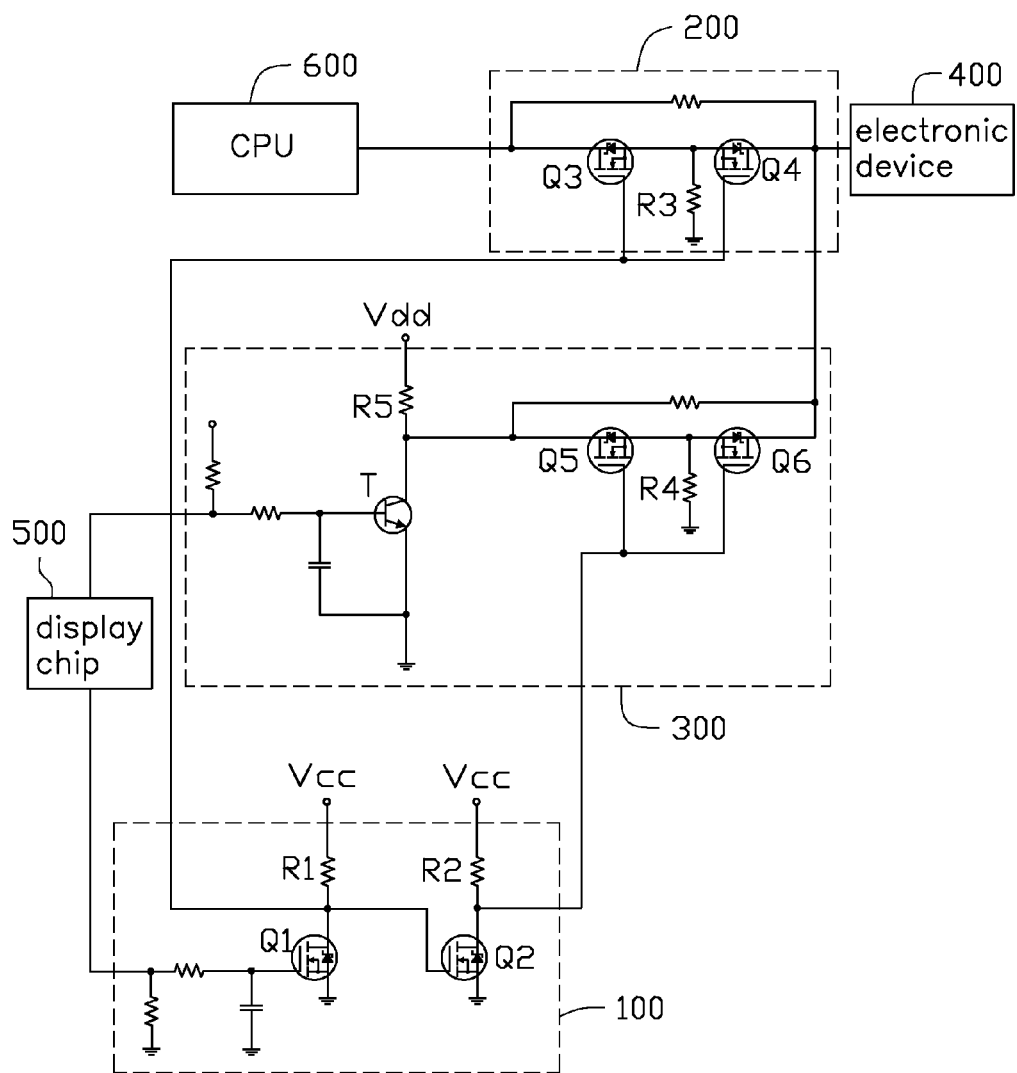
FIG. 2 is a circuit diagram of the back light brightness adjusting apparatus of FIG. 1.

FIG. 2 illustrates that the control unit 100 includes a first switch Q1 and a second switch Q2. Each of the first switch Q1 and the second switch Q2 includes a first terminal, a second terminal, and a third terminal. The first terminal of the first switch Q1 is configured to receive a first control signal from a display chip 500. The second terminal of the first switch Q1 is grounded. The third terminal of the first switch Q1 is configured to receive a first direct current (DC) voltage Vcc via a first resistor R1. The third terminal of the first switch Q1 is configured to output a first switch signal. The third terminal of the first switch Q1 is electrically coupled to the first terminal of the second switch Q2. The second terminal of the second switch Q2 is grounded. The third terminal of the second switch Q2 is configured to receive the first DC voltage Vcc via a second resistor R2. The third terminal of the second switch Q2 is configured to output a second switch signal.

In at least one embodiment, the first switch Q1 and the second switch Q2 are re-channel metal-oxide-semiconductor field-effect transistors (MOSFETs). The first terminal, the second terminal, and the third terminal of the first switch Q1 and the second switch Q2 are respectively gate, source, and drain. The first DC voltage Vcc is +5 volts.

The first adjusting unit 200 includes a third switch Q3 and a fourth switch Q4. Each of the third switch Q3 and the fourth switch Q4 includes a first terminal, a second terminal, and a third terminal. The first terminals of the third switch Q3 and the fourth switch Q4 are electrically coupled to the third terminal of the first switch Q1 for receiving the first switch signal. The second terminals of the third switch Q3 and the fourth switch Q4 are electrically coupled together and grounded via a third resistor R3. The third terminal of the third switch Q3 is configured to receive a first adjusting signal from a central processing unit (CPU) 600. The third terminal of the fourth switch Q4 is electrically coupled to the electronic device 400.

In at least one embodiment, the third switch Q3 and the fourth switch Q4 are re-channel MOSFETs. The first terminal, the second terminal, and the third terminal of the third switch Q3 and the fourth switch Q4 are respectively gate, source, and drain.

The second adjusting unit 300 includes a fifth switch Q5, a sixth switch Q6, and a seventh switch T. Each of the fifth switch Q5, the sixth switch Q6, and the seventh switch T includes a first terminal, a second terminal, and a third terminal. The first terminals of the fifth switch Q5 and the sixth switch Q6 are electrically coupled to the third terminal of the second switch Q2 for receiving the second switch signal. The second terminals of the fifth switch Q5 and the sixth switch Q6 are electrically coupled together and grounded via a fourth resistor R4. The third terminal of the fifth switch Q5 is configured to receive a second DC voltage Vdd via a fifth resistor R5. The third terminal of the sixth switch Q6 is electrically coupled to the electronic device 400. The first terminal of the seventh switch T is configured to receive a second control signal from the display chip 500. The second terminal of the seventh switch T is grounded. The third terminal of the seventh switch T is electrically coupled to the third terminal of the fifth switch Q5.

In at least one embodiment, the fifth switch Q5 and the sixth switch Q6 are re-channel MOSFETs. The first terminal, the second terminal, and the third terminal of the fifth switch Q5 and the sixth switch Q6 are respectively gate, source, and drain. The seventh switch T is an npn type transistor. The first terminal, the second terminal, and the third terminal of the seventh switch T are respectively base, emitter, and collector. The second DC voltage Vdd is a +3.3 volts auxiliary voltage.

In use, when the electronic device 400 is turned on, the display chip 500 outputs a low voltage level first control signal and a high voltage level second control signal. The first terminal of the first switch Q1 receives the low voltage level first control signal. The first switch Q1 is turned off. The third terminal of the first switch Q1 outputs a high voltage level first switch signal. The first terminal of the second switch Q2 receives the high voltage level first switch signal. The second switch Q2 is turned on. The third terminal of the second switch Q2 outputs a low voltage level second switch signal. The first terminals of the third switch Q3 and the fourth switch Q4 receive the high voltage level first switch signal. The third switch Q3 and the fourth switch Q4 are turned on. The first terminal of the seventh switch T receives the high voltage level second control signal. The seventh switch T is turned on. The first terminals of the fifth switch Q5 and the sixth switch Q6 receive the low voltage level second switch signal. The fifth switch Q5 and the sixth switch Q6 are turned off. The electronic device 400 receives the first adjusting signal from the CPU 600 and adjusts the back light brightness according to the first adjusting signal.

When the electronic device 400 is turned off, the display chip 500 outputs a high voltage level first control signal and a low voltage level second control signal. The first terminal of the first switch Q1 receives the high voltage level first control signal. The first switch Q1 is turned on. The third terminal of the first switch Q1 outputs a low voltage level first switch signal. The first terminal of the second switch Q2 receives the low voltage level first switch signal. The second switch Q2 is turned off. The third terminal of the second switch Q2 outputs a high voltage level second switch signal. The first terminals of the third switch Q3 and the fourth switch Q4 receive the low voltage level first switch signal. The third switch Q3 and the fourth switch Q4 are turned off. The first terminal of the seventh switch T receives the low voltage level second control signal. The seventh switch T is turned off. The first terminals of the fifth switch Q5 and the sixth switch Q6 receive the high voltage level second switch signal. The fifth switch Q5 and the sixth switch Q6 are turned on. The electronic device 400 receives a second adjusting signal from the display chip 500 and adjusts the back light brightness according to the second adjusting signal.

The embodiments shown and described above are only examples. Many details are often found in the art such as the other features of a back light brightness adjusting apparatus. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A back light brightness adjusting apparatus for adjusting a back light brightness of an electronic device comprising:
   a control unit configured to receive a first control signal from a display chip, and configured to output at least one of a first switch signal or a second switch signal according to the first control signal, wherein when the electronic device is turned on, the control unit is configured to output the first switch signal at a first voltage and the second switch signal at a second voltage, and the electronic device receives a first adjusting signal from a central processing unit (CPU) and adjusts the back light brightness according to the first adjusting signal, and wherein when the electronic device is turned off, the control unit outputs the first switch signal at a third voltage and the second switch signal at a fourth voltage, and the electronic device receives a second adjusting signal from the display chip and adjusts the back light brightness according to the second adjusting signal;
   a first adjusting unit electrically coupled to the electronic device; and
   a second adjusting unit electrically coupled to the electronic device; the second adjusting unit configured to receive a second control signal from the display chip.

2. The back light brightness adjusting apparatus of claim 1, wherein the control unit comprises a first switch and a second switch; each of the first switch and the second switch comprises a first terminal, a second terminal, and a third terminal; the first terminal of the first switch is configured to receive the first control signal from the display chip; the second terminal of the first switch is grounded; the third terminal of the first switch is configured to receive a first direct current (DC) voltage via a first resistor; the third terminal of the first switch is configured to output the first switch signal; the third terminal of the first switch is electrically coupled to the first terminal of the second switch; the second terminal of the second switch is grounded; the third terminal of the second switch is configured to receive the first DC voltage via a second resistor; and the third terminal of the second switch is configured to output the second switch signal.

3. The back light brightness adjusting apparatus of claim 2, wherein the first switch and the second switch are n-channel metal-oxide-semiconductor field-effect transistors (MOSFETs); the first terminal, the second terminal, and the third terminal of the first switch and the second switch are gate, source, and drain respectively; and the first DC voltage is +5 volts.

4. The back light brightness adjusting apparatus of claim 2, wherein the first adjusting unit comprises a third switch and a fourth switch; each of the third switch and the fourth switch comprises a first terminal, a second terminal, and a third terminal; the first terminals of the third switch and the fourth switch are electrically coupled to the third terminal of the first switch for receiving the first switch signal; the second terminals of the third switch and the fourth switch are electrically coupled together and grounded via a third resistor; the third terminal of the third switch is configured to receive the first adjusting signal from the CPU; and the third terminal of the fourth switch is electrically coupled to the electronic device.

5. The back light brightness adjusting apparatus of claim 4, wherein the third switch and the fourth switch are n-channel MOSFETs; and the first terminal, the second terminal, and the third terminal of the third switch and the fourth switch are gate, source, and drain respectively.

6. The back light brightness adjusting apparatus of claim 4, wherein the second adjusting unit comprises a fifth switch, a sixth switch, and a seventh switch; each of the fifth switch, the sixth switch, and the seventh switch comprises a first terminal, a second terminal, and a third terminal; the first terminals of the fifth switch and the sixth switch are electrically coupled to the third terminal of the second switch for receiving the second switch signal; the second terminals of the fifth switch and the sixth switch are electrically coupled together and grounded via a fourth resistor; the third terminal of the fifth switch is configured to receive a second DC voltage via a fifth resistor; the third terminal of the sixth switch is electrically coupled to the electronic device; the first terminal of the seventh switch is configured to receive the second control signal from the display chip; the second terminal of the seventh switch is grounded; and the third terminal of the seventh switch is electrically coupled to the third terminal of the fifth switch.

7. The back light brightness adjusting apparatus of claim 6, wherein the fifth switch and the sixth switch are n-channel MOSFETs; the first terminal, the second terminal, and the third terminal of the fifth switch and the sixth switch are gate, source, and drain respectively; the seventh switch is an npn type transistor; the first terminal, the second terminal, and the third terminal of the seventh switch are base, emitter, and collector; and the second DC voltage is a +3.3 volts auxiliary voltage.

8. The back light brightness adjusting apparatus of claim 1, wherein the first voltage level is a high voltage level; and the second voltage level is a low voltage level.

9. A back light brightness adjusting apparatus for adjusting a back light brightness of an electronic device comprising:
   a control unit configured to receive a first control signal from a display chip, and configured to output at least one of a first switch signal or a second switch signal according to the first control signal; the control unit comprises a first switch and a second switch;
   a first adjusting unit electrically coupled to the electronic device; the first adjusting unit comprises a third switch and a fourth switch; and
   a second adjusting unit electrically coupled to the electronic device; the second adjusting unit is configured to receive a second control signal from the display chip; the second adjusting unit comprises a fifth switch, and a sixth switch, wherein when the electronic device is turned on, the display chip is configured to output the second control signal at a first voltage and the first control signal at a second voltage, the first switch turns off and outputs the first switch signal at a third voltage, the second switch turns on and outputs the second switch signal at a fourth voltage, the third switch and the fourth switch turn on, the fifth switch and the sixth switch turn off, and the electronic device receives a first adjusting signal from a central processing unit (CPU) and adjusts the back light brightness according to the first adjusting signal, and wherein when the electronic device is turned off, the display chip is configured to output the second control signal at a fifth voltage and the first control signal at a sixth voltage, the first switch turns on and outputs the first switch signal at a seventh voltage, the second switch turns off and outputs the second switch signal at an eighth voltage, the third switch and the fourth switch turn off, the fifth switch and the sixth switch turn on, and the electronic device receives a second adjusting signal from the display chip and adjusts the back light brightness according to the second adjusting signal.

10. The back light brightness adjusting apparatus of claim 9, wherein each of the first switch and the second switch comprises a first terminal, a second terminal, and a third terminal; the first terminal of the first switch is configured to receive the first control signal from the display chip; the second terminal of the first switch is grounded; the third terminal of the first switch is configured to receive a first direct current (DC) voltage via a first resistor; the third terminal of the first switch is configured to output the first switch signal; the third terminal of the first switch is electrically coupled to the first terminal of the second switch; the second terminal of the second switch is grounded; the third terminal of the second switch is configured to receive the first DC voltage via a second resistor; and the third terminal of the second switch is configured to output the second switch signal.

11. The back light brightness adjusting apparatus of claim 10, wherein the first switch and the second switch are n-channel metal-oxide-semiconductor field-effect transistors (MOSFETs); the first terminal, the second terminal, and the third terminal of the first switch and the second switch are gate, source, and drain respectively; and the first DC voltage is +5 volts.

12. The back light brightness adjusting apparatus of claim 10, wherein each of the third switch and the fourth switch comprises a first terminal, a second terminal, and a third terminal; the first terminals of the third switch and the fourth switch are electrically coupled to the third terminal of the first switch for receiving the first switch signal; the second terminals of the third switch and the fourth switch are electrically coupled together and grounded via a third resistor; the third terminal of the third switch is configured to receive the first adjusting signal from the CPU; and the third terminal of the fourth switch is electrically coupled to the electronic device.

13. The back light brightness adjusting apparatus of claim 12, wherein the third switch and the fourth switch are n-channel MOSFETs; and the first terminal, the second terminal, and the third terminal of the third switch and the fourth switch are gate, source, and drain respectively.

14. The back light brightness adjusting apparatus of claim 12, wherein the second adjusting unit further comprises a seventh switch; each of the fifth switch, the sixth switch, and the seventh switch comprises a first terminal, a second terminal, and a third terminal; the first terminals of the fifth switch and the sixth switch are electrically coupled to the third terminal of the second switch for receiving the second switch signal; the second terminals of the fifth switch and the sixth switch are electrically coupled together and grounded via a fourth resistor; the third terminal of the fifth switch is configured to receive a second DC voltage via a fifth resistor; the third terminal of the sixth switch is electrically coupled to the electronic device; the first terminal of the seventh switch is configured to receive the second control signal from the display chip; the second terminal of the seventh switch is grounded; and the third terminal of the seventh switch is electrically coupled to the third terminal of the fifth switch.

15. The back light brightness adjusting apparatus of claim 14, wherein the fifth switch and the sixth switch are n-channel MOSFETs; the first terminal, the second terminal, and the third terminal of the fifth switch and the sixth switch are gate, source, and drain respectively; the seventh switch is an npn type transistor; the first terminal, the second terminal, and the third terminal of the seventh switch are base, emitter, and collector; and the second DC voltage is a +3.3 volts auxiliary voltage.

16. The back light brightness adjusting apparatus of claim 9, wherein the first voltage level is a high voltage level; and the second voltage level is a low voltage level.

* * * * *